Dec. 20, 1966  P. S. ZAK  3,292,447

MODIFIED GLOBOID GEARING

Filed April 24, 1964

United States Patent Office 3,292,447
Patented Dec. 20, 1966

3,292,447
MODIFIED GLOBOID GEARING
Pavel Samoilovich Zak, Moscow, U.S.S.R., assignor to Vsesoyuzny Nauchno-Issledovatelsky i Proektno-Tekhnologichesky Institute Ugoljnoga Mashinostrojenija, Moscow, U.S.S.R.
Filed Apr. 24, 1964, Ser. No. 364,062
13 Claims. (Cl. 74—458)

The invention relates to globoid worm gearings and, more particularly, to globoid gearings with a modified helix line of both the operating and generating worms.

A known form of globoid worm gearing is characterized in having a constant circular pitch of the worm thread.

This form of the globoid worm gearing has certain drawbacks among which are: non-uniform load distribution of the mesh area, load concentration at the foremost part of the mesh area as a result of inevitable deformations and errors obtained during manufacturing and assembly; and shocks accompanying the engagement of the beginning of the gearing of the worm thread with the successive teeth of the worm wheel in consequence of the fact that the worm thread gearing is engaged all at once over the full height of its profile.

The most significant drawback of the conventional form of the globoid worm gearing is the insufficient rate of speed of the contact line displacement along the surface of the wheel tooth (rolling speed) as well as inconstancy of said speed endwise of the mesh area, both factors limiting the operation of the gearing in respect of loading capacity and efficiency. Various methods have been suggested to eliminate the above-mentioned disadvantages, one of which consists of chamfering the worm, which results in nothing more than a modification of the conventional form of the gearing with the worm body reduced its ends.

However the most effective part of the mesh area becomes thereupon inoperative which results in sharply decreasing the loading capacity of the gearing until the very end of running-in.

There have also been proposed modified globoid gearings having an increased mesh area both endwise and broadwise as compared with the conventional gearing. This is obtained by displacement of the under-cutting limit outside of either the wheel tooth or the worm thread. However, this does not fully eliminate said drawbacks.

It is an object of the present invention to overcome the previously mentioned drawbacks.

A principal object of the invention is to develop a modified globoid gearing that operates taking into account performance indices in conformity with the optimum mode of modifying the worm helixline, corresponding to a contact shape, which is unchangeable in the course of wear and therein decreases both the dynamic loads arising due to shocks accompanying the gearing of the worm threads origin with the next tooth of the worm wheel and the sensitivity of the globoid gearing to deformations and errors arising during manufacturing and assembling.

The problem is solved by a modified globoid gearing comprising a Cone worm with a smooth changing circular pitch of the worm threads and a worm wheel with teeth embracing the worm threads, said teeth being formed by a hobbing cutter, the generating surface of the latter coinciding with the surface of the worm threads, the wheel teeth and worm threads having contact at the full length of the worm thread working surface and, according to the invention, the wheel teeth and worm threads have a contact line which is displaced the full length of the wheel tooth at a uniform speed, or a uniformly diminishing speed or at uniform speed for the first half of the worm threads which exceeds a uniform speed at the rear half of the worm threads. The worm threads have on the extending part outside of their operating surfaces, spiral flanks ensuring smooth engagement of the threads by the full height of the profile irrespective of the degree of wear of the operating surface of the worm threads. The wheel teeth can also be made by means of a hubbing cutter with a generatrix surface coinciding with the surface of the worm threads in the middle part of the worm and with a gradual divergence towards both edges of the threads and towards both edges by the tooth height, said wheel teeth and worm threads having an initial contact therebetween in the form of a spot localized in the middle part of the worm thread operating surface, endwise and by the height and in the middle part of the wheel tooth operating surface endwise and by the height too, said spot thereafter, in the course of running-in, gradually and uniformly extends fully on the operating surfaces of both the worm threads and wheel teeth.

It has been proved that modifying of the Cone worm helixline in accordance with the contact form generated as a result of great wear and kept constant in the course of the subsequent wear, provides for a considerable increase of the rolling speed, which results in reducing the heating of the continuous surfaces and increasing thereupon both the loading capacity and the efficiency of the globoid worm gearing.

Other objects and advantages of the present invention will be evident from the following description of the invention and the accompanying drawings, in which.

The globoid gearing comprises a worm 1 and a worm wheel 2.

Figure 1:
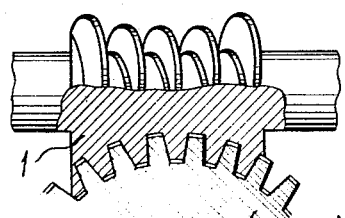
FIG. 1 is a view particularly in section of a globoid gearing.
Figure 2:
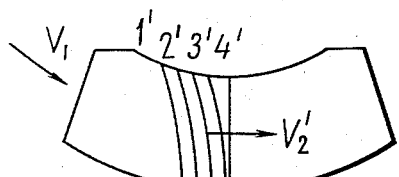
FIG. 2 shows the consequent positions of the contact line on the wheel tooth surface of a conventional globoid gearing with a constant circular pitch of the worm thread.

The peripheral speed of worm 1 is indicated in FIG. 2 of the drawing by $V_1$. A contact line is formed in the wheel tooth surface and this contact line has a displacement speed perpendicular to the line. The contact line displacement speed for conventional globoid gearing is shown in FIG. 2 by $V_2{}^1$, and the positions of the contact line are shown at $1'$—$1'$, $2'$—$2'$, $3'$—$3'$, $4'$—$4'$. The rate of speed is variable and mathematical analysis shows that in the initial phase of toothing, $V_2'$ is lower than an average value, said speed being increased while approaching the middle part of the wheel tooth.

Figure 3:
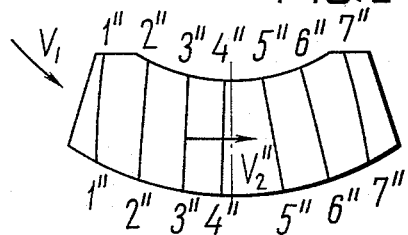
FIG. 3 shows the consequent positions of the contact line on the wheel tooth surface of a modified globoid gearing with a smoothly changing circular pitch of the worm thread.

In FIG. 3 are shown the contact line dispalcement speed $V_2''$, and the consequent positions of the line at $1''$—$1''$, $2''$—$2''$, $3''$—$3''$, $4''$—$4''$ on the wheel tooth surface of the modified globoid gearing according to the invention. The mesh area is somewhat widened due to the changing of the worm thread's circular pitch, while it is also variable. The mode of changing of said speed depends upon the mode of changing of the worm thread's circular pitch.

Figure 4:
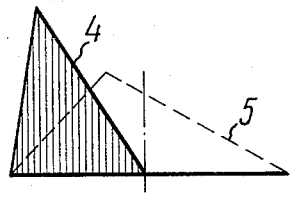
FIG. 4 illustrates the mode of load distribution endwise of the toothing.
Figure 5:
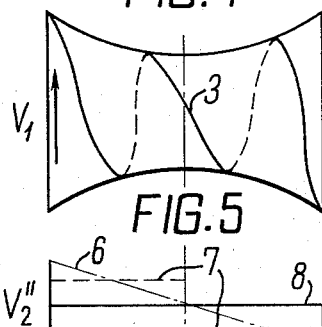
FIG. 5 shows the worm wheel and its direction of rotation in relation to the load distribution in FIG. 4.

As schematically shown in FIG. 5, when worm 1 having a helix-line of threads 3 is rotated at a speed $V_1$ in the direction of the arrow, the worm thread will be actively engaged in its left part. The load distribution between simultaneously engaged teeth is schematically shown in FIG. 4 in solid lines 4 for conventional toothing and by dotted lines 5 for the gearing according to the invention. In both cases the maximum stress will be within the foremost half of the total worm length. It should additionally be mentioned that in addition to the unfavorable stress concentration, as shown the mating surfaces are not perfectly adjacent to each other. The combination of the two phenomena brings about high specific pressures in the place of contact, which, in turn, results in increased friction and heating of the wheel surface, thus limiting the loading capacity of the gearing.

Figure 6:
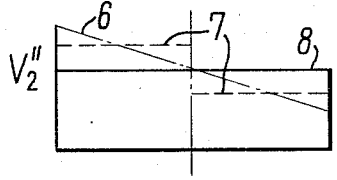
FIG. 6 shows the speed of the contact lines between the worm threads and the wheel teeth in relation to FIGS. 4 and 5.

The increment in the contact line displacement speed of the gearing according to the invention favorably influences the contact conditions because the tooth surface of the wheel has no time to become strongly heated. Therefore it is important to ensure a high contact line displacement speed $V_2''$ on the wheel tooth within the contact with the foremost half of the worm thread, as shown by lines 6 and 7 in FIG. 6, or at least to provide for a constant speed $V_2''$ over the full length of the gearing as shown by line 8 on the same figure.

Said speed characteristics can be obtained by proper variation of the globoid worm circular pitch. This is possible due to the known stable relationship existing between the helical line of the thread 3 (in FIG. 5) and the uniformity of the speed $V_2''$ as shown by reference lines 6, 7 and 8 in FIG. 6. This relationship allows those skilled in the art to apply the known methods for each specific gearing, having specific size and transmission ratio, for determining both the pattern in which the speed $V_2''$ changes along the given helical line of the thread and, reversely, knowing the pattern of changes of the speed $V_2''$ to determine the configuration of the helical line.

It is believed unnecessary to go into detail on the methods of obtaining the form of the worm thread and wheel teeth, since these methods are well known as shown for example, in "Globoid Gearing" (1962, USSR, Moscow, Publishing House, "Mashgiz").

Figure 7:
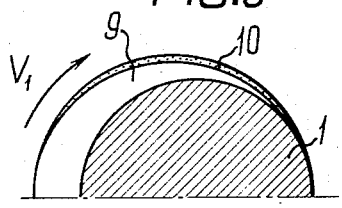
FIG. 7 is a section through Cone worm perpendicular to its axis.

It is recommended to manufacture a spiral-shaped flank 10 at the foremost part, outside of the operating surface 9 of the worm thread (FIG. 7). This ensures smooth gearing of the worm threads by the full height of the profile irrespective of the degree of wear of the operating surface of the worm threads. For driving worms which are not to be used as driven ones, the flank on the thread extending part need not be of spiral shape. However, a spiral-shaped flank on the foremost part of the worm thread is recommended for all types of globoid worm gearing.

Figure 8:
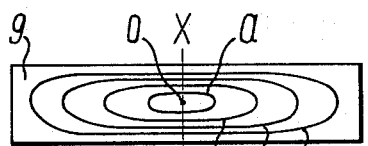
FIG. 8 is a development of the worm thread operating surface.

On the development of the worm thread operating surface (FIG. 8) there is shown an axis x—x which indicates the middle of the worm length. Point 0 indicates the spot where the thread surface of the operating worm is to coincide with the thread surface of the generatrix worm. The closed ovals, a, b, c, d are the loci of points of a similar clearance between the thread surface of the operating worm and the thread surface of the generating worm, the clearances being gradually increased from point 0 towards oval a, then towards oval b, etc.

Accordingly the initial contact of the operating worm surface with the booth of the wheel cut by said generatrix worm will be at the point 0 of the worm thread surface as well as in the center of the wheel tooth surface and will gradually extend to the full length of both operating surfaces in the course of running-in.

I claim:
1. A modified globoid gearing comprising a globoid worm including a helical worm thread having a smooth changing circular pitch and a worm wheel with teeth embracing the worm thread, said teeth being generated by a hobbing cutter with a generating surface coinciding with the surface of the thread of said worm; said teeth and worm thread being in contact with each other along the full length of the worm thread operating surface; said wheel teeth and worm thread having a contact line which undergoes displacement along the full length of the wheel tooth at a uniform average speed.

2. Gearing as claimed in claim 1 wherein said worm thread has spiral-shaped flanks on the foremost end extending beyond their active engaging surface for insuring smooth engagement of the worm thread over the full height of the profile irrespective of the degree of wear of the engaging surface of the worm thread.

3. A modified globoid gearing comprising a globoid worm including a helical worm thread having a smoothly changing circular pitch and a worm wheel with teeth embracing the worm thread, said teeth being generated by a hobbing cutter with a generating surface coinciding with the surface of the thread of said worm; said teeth and worm thread being in contact with each other along the full length of the worm thread operating surface; said wheel teeth and worm thread having a contact line which undergoes displacement along the full length of the wheel tooth at a uniformly diminishing speed.

4. Gearing as claimed in claim 3 wherein said worm thread has spiral-shaped flanks on the foremost end extending beyond their active engaging surface for insuring smooth engagement of the worm thread over the full height of the profile irrespective of the degree of wear of the engaging surface of the worm thread.

5. A modified globoid gearing comprising a globoid worm including a helical worm thread having a helix line with a smoothly changing circumferential lead and a worm wheel with teeth embracing the worm thread, said teeth being generated by a hobbing cutter with a generating surface coinciding with the surface of the thread of said worm; said teeth and worm thread being in contact with each other along the full length of the worm thread operating surface; said wheel teeth and worm thread having a contact line which undergoes displacement along the full length of the wheel tooth, said contact line having a uniform speed at the foremost part of the worm, which exceeds a uniform speed of the contact line at the rearmost part of the worm.

6. Gearing as claimed in claim 5 wherein said worm thread has spiral-shaped flanks on the foremost end extending beyond their active engaging surface for insuring smooth engagement of the worm thread over the full height of the profile irrespective of the degree of wear of the engaging surface of the worm thread.

7. A modified globoid gearing comprising a globoid worm and a worm wheel; said worm having threads with spiral-shaped flanks at the foremost end of the threads extending beyond their active engaging surface, said flanks insuring smooth engagement of the worm threads over the full height of the profile irrespective of the degree of wear of the operating surface of the worm threads.

8. A modified globoid gearing comprising a Cone worm and a worm wheel with teeth generated by a hobbing cutter with a generating surface of the latter coinciding with the surface of the threads of said worm in its middle part and with a gradual deviation both transversely and longitudinally; said wheel teeth and worm threads having an initial contact therebetween in the form of a spot located in the middle of the worm thread operating surface and also in the middle of the wheel tooth operating surface, said spot thereafter, in the course of running-in, gradually and uniformly extending fully over said operating surfaces of both the worm threads and wheel teeth.

9. A modified globoid gearing comprising a Cone worm and a worm wheel with teeth generated by a hobbing cutter with a generating surface coinciding with the thread surface of said worm in its middle part and with a gradual deviation both transversely and longitudinally; said wheel teeth and worm thread having an initial contact therebetween in the form of a spot located in the middle of the worm thread operating surface and in the middle of the wheel tooth operating surface, said spot thereafter, in the source of running-in, gradually and uniformly extendfully over said operating surfaces of both the worm thread and wheel teeth, said wheel teeth and worm thread having a line of contact after running-in, said line undergoing displacement along the full length of the wheel tooth at a uniform average speed.

10. A modified globoid gearing comprising a Cone worm and a worm wheel with teeth generated by a hobbing cutter with a generating surface coinciding with the thread surface of said worm in its middle part and with a gradual deviation both transversely and longitudinally; said wheel teeth and worm threads having an initial contact therebetween in the form of a spot located in the the middle part of the worm thread operating surface and in the middle part of the wheel tooth operating surface, said spot thereafter, in the course of running-in, gradually and uniformly extending fully over said operating surfaces of both the worm threads and wheel teeth, said wheel teeth and worm threads having a line of contact after running-in, said line undergoing displacement along the full length of the wheel tooth, said contact line having maximum speed at the foremost portion of the worm.

11. A modified globoid gearing comprising a Cone worm and a worm wheel with teeth generated by a hobbing cutter with a generating surface coinciding with the surface of the threads of said worm in its middle part and with a gradual deviation both transversely and longitudinally; said wheel teeth and worm threads having an initial contact therebetween in the form of a spot located in the middle part of the worm thread operating surface and in the middle part of the wheel tooth operating surface, said spot thereafter, in the course of running-in, gradually and uniformly extending fully cover said operating surfaces of both the worm threads and wheel teeth; said threads of said worm having spiral-shaped flanks on the foremost end extending beyond their opearting surface, said flanks insuring smooth engagement of the worm threads over the full height of the profile irrespective of the degree of wear of the operating surface of the worm threads.

12. A modified globoid gearing comprising a Cone worm and a worm wheel with teeth generated by a hobbing cutter with a generating surface coinciding with the surface of the threads of said worm in its middle part and with a gradual deviation both transversely and longitudinally; said wheel teeth and worm threads having an initial contact therebetween in the form of a spot located in the middle part of the worm thread operating surface and in the middle part of the wheel tooth operating surface, said spot thereafter, in the course of running-in, gradually and uniformly extending fully over said operating surfaces of both the worm threads and wheel teeth, said wheel teeth and worm threads having a line of contact after running-in, said line undergoing displacement along the full length of the wheel tooth with a constant speed, the threads of said worm having spiral-shaped flanks on the foremost end extending beyond their operating surface, said flanks insuring smooth engagement of the worm threads over the full height of the profile irrespective of the degree of wear of the operating surface of the worm threads.

13. A modified globoid gearing comprising a Cone worm and a worm wheel with teeth generated by a hobbing cutter with a generating surface coinciding with the surface of the threads of said worm in its middle part and with a gradual deviation both transversely and longitudinally; said wheel teeth and worm threads having an initial contact therebetween in the form of a spot located in the middle part of the worm thread operating surface and also in the middle part of the wheel tooth operating surface, said spot thereafter, in the course of running-in, gradually and uniformly extending fully over said operating surfaces of both the worm threads and wheel teeth, said wheel teeth and worm threads having a line of contact after running-in, said line undergoing displacement along the full length of the wheel tooth, said contact line having maximum speed at the foremost portion of the worm; said threads of said worm having spiral-shaped flanks on the foremost end extending beyond their operating surface, said flanks insuring smooth engagement of the worm threads over the full height of the profile irrespective of the degree of wear of the operating surface of the threads.

References Cited by the Examiner

UNITED STATES PATENTS

| | | | |
|---|---|---|---|
| 1,792,782 | 2/1931 | Trbojevich | 74—458 |
| 1,797,460 | 3/1931 | Wildhaber | 74—458 X |
| 1,797,461 | 3/1931 | Wildhaber | 74—458 |
| 1,822,800 | 9/1931 | Cone | 74—458 |
| 2,935,888 | 5/1960 | Wildhaber | 74—458 |
| 3,045,557 | 7/1962 | Yamamoto et al. | 74—458 X |

DAVID J. WILLIAMOWSKY, *Primary Examiner.*

L. H. GERIN, *Assistant Examiner.*